United States Patent
Small

(10) Patent No.: US 6,297,739 B1
(45) Date of Patent: Oct. 2, 2001

(54) SYSTEM AND METHOD FOR PROVIDING ACCESS TO SELECTED ANIMALS TO A SECURED ENCLOSURE

(76) Inventor: David K. Small, 6917 Serenity Way, San Jose, CA (US) 95120

( * ) Notice: Subject to any disclaimer, the term of this patent is extended or adjusted under 35 U.S.C. 154(b) by 0 days.

(21) Appl. No.: 09/528,905

(22) Filed: Mar. 20, 2000

(51) Int. Cl.⁷ .................................................. G08B 23/00
(52) U.S. Cl. ................................. 340/573.3; 340/573.1; 340/686.6; 340/686.1; 340/572.1
(58) Field of Search ............................ 340/573.1, 573.2, 340/573.3, 573.4, 666, 686.1, 686.6, 552, 553, 554–567, 572.1–572.9, 825.31, 825.32, 825.34

(56) References Cited

U.S. PATENT DOCUMENTS

| | | |
|---|---|---|
| 4,461,241 * | 7/1984 | Ostler .................................. 119/51 R |
| 4,532,892 * | 8/1985 | Kuzara ................................ 119/51 R |
| 4,551,713 | 11/1985 | Aossey . |
| 4,918,425 | 4/1990 | Greenberg et al. . |
| 5,044,325 | 9/1991 | Miksitz . |
| 5,117,780 | 6/1992 | Wooten et al. . |
| 5,150,099 | 9/1992 | Lienau . |
| 5,622,140 * | 4/1997 | McIlnay-Moe ....................... 119/166 |
| 5,850,196 | 12/1998 | Mowers . |
| 5,872,516 | 2/1999 | Bonge, Jr. . |
| 5,984,875 | 11/1999 | Brune . |
| 5,992,096 * | 10/1998 | De La Cerda et al. ................ 49/169 |
| 6,057,764 * | 8/1998 | Williams ............................ 340/572.1 |

* cited by examiner

*Primary Examiner*—Jeffery Hofsass
*Assistant Examiner*—Daniel Previl
(74) *Attorney, Agent, or Firm*—Knobbe, Martens, Olson & Bear, LLP

(57) ABSTRACT

A system and method are described for providing access to a secured enclosure, such as a house or a fenced yard, to only a set of one or more selected animals while maintaining a high level of enclosure security. Each selected animal carries an identification device with an identifying code. An identification sensor scans for a selected identification device upon the detection of an animal's existence near the animal door. For detecting an animal at the outside of the animal door, a weight sensor is used, and for detecting an animal at the inside of the animal door, a motion sensor is used. The weight sensor is also configured to discriminate between the weight of each of the selected animals from unauthorized animals. The animal access system is also coupled to the enclosure's security system, to maintain the integrity of the enclosure security while enabling the selected animals to enter and exit the enclosure at will.

8 Claims, 2 Drawing Sheets

SYSTEM AND METHOD FOR PROVIDING ACCESS TO SELECTED ANIMALS TO A SECURED ENCLOSURE

FIELD OF THE INVENTION

This invention relates to a system and method for providing access to a secured enclosure only to a selected set of animals.

BACKGROUND OF THE INVENTION

According to the 1997 U.S. Pet Ownership and Demographics Sourcebook (American Veterinary Medical Association; ISBN: 1882691024), approximately 31.6% of U.S. households have at least one dog and 27.3% of U.S. households have at least one cat. Many of these household pets require access to areas both inside and outside of the home. For example, a dog may spend the bulk of its time indoors, but it typically goes outside for the purposes of urination and defecation. Similarly, many dogs and cats are given the freedom to enter or leave the home at will so that they can have more varied and interesting lives.

Providing a pet access to the inside and outside areas of the household often requires human intervention. Upon notification by the dog or cat that it wishes to enter or leave, the pet owner must open and close a door to allow the pet to pass through. To overcome that problem, the pet owner may provide an access opening (or "doggie door") that is continually open, or capable of being opened at will by the pet, thereby providing the pet with the freedom of access without requiring human intervention. Such access openings, however, have the undesirable consequence of permitting access to the inside of the home to unwanted animals such as other dogs or cats, raccoons, rodents, or even human thieves.

Efforts have been made to address the security problem associated with "doggie doors." For example, U.S. Pat. No. 5,992,096 to De La Cerda et al. discloses a controllable pet access system that utilizes an identifying tag carried on the collar worn by the pet. To keep out undesired animals while permitting access to the pet, the De La Cerda system attempts to detect the identifying tag worn by the pet upon a motion sensor's detection of the animal at the inside or outside of a pet door. The pet door is only unlocked upon receiving a signal from an appropriately coded tag, thereby providing access to only the desired pet or pets. While somewhat effective, the De La Cerda access system suffers from various deficiencies. First, because the identifying tag is carried by the pet's removable collar, the access system is vulnerable to an unauthorized intruder removing the identifying tag from the pet and using it to enter the home. Second, there is no backup detector in case the first detector is insufficient to prevent abuse. Finally, the De La Cerda access system is not configured to couple to the enclosure's security system, which means that an intruder could break through the pet door undetected. This inability to detect unauthorized breaches of the pet door, a vulnerable point in the household's security to begin with, reduces the overall integrity of the household's security.

SUMMARY OF THE INVENTION

The present invention is a programmable pet security system that surmounts the deficiencies of prior art systems by providing access to an enclosure protected by an existing security system to only a set of one or more selected animals while maintaining a high level of enclosure security. In the preferred embodiment of the present invention, the animal access system comprises a secured enclosure (e.g., a house, or an area bounded by a fence), an access opening sized to permit an animal to pass there through, an animal door that blocks the access opening, an animal door control module to control when the animal door may be opened, an animal door lock module with at least one corresponding animal door lock, a weight sensor module with a corresponding weight sensor, a motion sensor module with a corresponding motion sensor, an identification sensor module with a corresponding identification sensor, one or more identification devices, a security system interface controller, and a user interface. The identification device, detectable by the identification sensor, is preferably configured to be implanted into the body of each selected animal, or at least carried by the pet in a manner that is not easily removed. The weight sensor module, which is coupled to the weight sensor preferably located outside the animal door, is configured to discriminate between the weights of the selected animals and those of other unauthorized animals. The motion sensor that detects movement near the animal door is preferably mounted on the inside of the animal door. The animal door control module is preferably coupled to the enclosure's security system controller to maintain the integrity of the enclosure's security while permitting the selected animals to enter and exit the secured enclosure at will.

In the preferred mode of operation, the identification sensor module triggers the identification sensor to scan for a selected animal upon being prompted to do so by one of at least two events: either the detection by the weight sensor of a weight for an animal outside the enclosure desiring to come in that corresponds to that of a selected animal, or the detection by the motion sensor of an animal near the inside of the animal door desiring to go out. The identification sensor then determines whether the pet is part of the selected set by scanning for an identification device. If an authorized device is borne by the pet, the animal door control module sends a signal to unlock the animal door, temporarily disabling the security system alarm for a preset period of time.

The present invention provides improved security not found in previously disclosed systems. First, because the identification devices are implantable into the bodies of the selected animals, the risk that an identification device would be lost or taken by someone to access the secured enclosure is virtually eliminated. Second, because the weight sensor can discriminate between animals of differing weights, it provides an additional level of protection from undesirable animals or burglars, even if an intruder were to hand carry the authorized pet to trigger the identification sensor. As soon as the intruder stepped on the weight sensor to pass through the door, the weight sensor module (or animal door control module) would determine that the weight detected does not fall within a pre-selected range. Third, by coupling the security system interface controller with the animal door control module, the animal access system provides access to a set of selected animals while the household security system remains armed and sensitive to unauthorized entry through the animal door or any other door in the enclosure. These and other aspects of the invention will be apparent to the skilled artisan from the following detailed description read in conjunction with the appended drawings, which are meant to illustrate and not to limit the invention.

DETAILED DESCRIPTION OF THE PREFERRED EMBODIMENT

Figure 1:
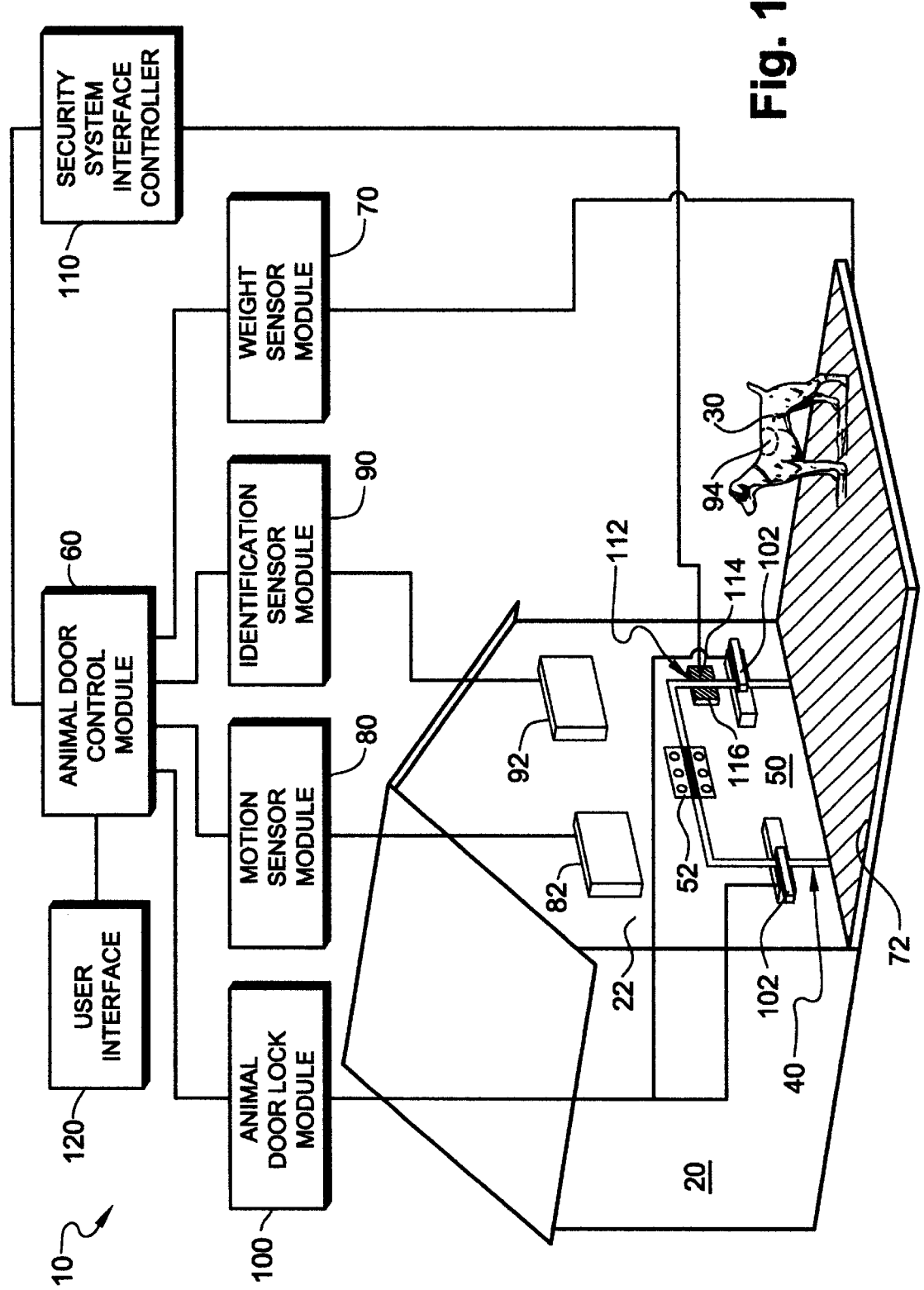
FIG. 1 is a schematic of the preferred embodiment of the present invention.

Referring to FIG. 1, the preferred embodiment of the present invention comprises an animal access system 10 for providing ingress and egress access to a secured enclosure 20 to only a predetermined set of one or more selected animals 30. The set of selected animals 30 comprises at least one pet (e.g., a dog or cat). Alternatively, the set of selected animals 30 may comprise a plurality of pets. The animal access system 10 comprises a secured enclosure 20, such as a home, having a boundary barrier 22 with an access opening 40 therein. The system further comprises an animal door 50 positioned to block the access opening 40, and an animal door control module 60. The animal door control module is coupled to a weight sensor module 70, a motion sensor module 80, an identification sensor module 90, an animal door lock module 100, a security system controller 110, and a user interface 120.

The animal door 50 has both an open position and a closed position, and substantially blocks the access opening 40 in its closed position. The animal door 50 is connected to the boundary barrier 22 by means for movably securing the door to the boundary barrier, such as a two-way hinge 52. The access opening 40 is sufficiently large to permit members of the set of selected animals 30 to pass therethrough. The boundary barrier 22 can be a wall or, alternatively, it can be a larger door that is sufficiently large to be used by people (as in a door-within-a-door arrangement). The animal door 50 is opened by pivoting it about the hinge 52 in either an inward or outward direction to permit the selected animal 30 to enter or leave the secured enclosure 20 at will. The animal door 50 may be opened by the selected animal 30 pushing on the door or, alternatively, by a controllable automated mechanism, such as a motor. In the preferred embodiment, the hinge 52 is located at the top of the animal door 50, and gravity serves as the restoring force that closes the animal door 50 once the selected animal 30 has traveled through the access opening 40. Alternatively, the hinge 52 may be located on the side of the door where the door is used in conjunction with a mechanism that provides a restoring force to close the animal door 50 after the animal has passed therethrough. Examples of such a mechanism include, but are not limited to, a spring or a motor, which may be incorporated into or linked to the hinge 52. A hingeless, sliding, (pocket style) animal door 50 could also be utilized, if desired.

Located preferably outside the secured enclosure 20 at ground level in front of the animal door 50 is a weight sensor 72 coupled to the weight sensor module 70. The weight sensor 72 is preferably positioned so that any animal (or intruder) must step on it to pass through the animal door 50. The weight sensor 72 produces a signal that corresponds to the weight of the animal, which is then communicated to the weight sensor module 70. The weight sensor module then converts the signal to a weight, based upon precorrelated ranges, and sends a corresponding signal to the animal door control module 60, which then determines whether the animal's weight is consistent with the weight of a selected animal 30. If so the animal door control module 60 triggers the identification sensor module 90 to search for an identification device, as described further below. If desired, the weight sensor module could be configured to not only convert the signal, but to make the weight assessment and communicate to the animal door control module that the weight is within an authorized range.

Located preferably inside the secured enclosure 20 proximate the animal door 50 is a motion sensor 82 coupled to the motion sensor module 80. The motion sensor 82 is positioned so that it can detect an animal approaching the animal door 50 from inside the secured enclosure 20. Upon detecting an animal approaching the animal door 50, the motion sensor 82 produces a signal that is sent to the motion sensor module 80, which then communicates a corresponding signal to the animal door control module 60 to trigger the identification sensor module 90.

The preferred embodiment of the present invention also includes an animal identification feature comprising the identification sensor module 90 referred to above, a corresponding identification sensor 92, and an identification device 94 securable to an animal. The identification sensor module 90 is coupled to the identification sensor 92, which is located in proximity to the animal door 50. The identification sensor 92 is configured to detect the identification device 94 when it comes within range. Preferably the identification device 94 is configured to be embedded subcutaneously in the body of the selected animal 30 at, for example, the dorsal midline between animal's shoulder blades. If desired, the device 94 may be secured to a lockable collar wrapped around the neck or leg of the selected animal 30, where the collar can only be removed by an authorized user. The identification device 94 is preferably a microchip transponder, which is a passive device encoded with a unique identifying code. An example of an acceptable identification sensor 92 and identification device 94 is the "HomeAgain" Companion Animal Retrieval System, manufactured by Schering-Plough. In that commercial system, the identification device 94 is approximately 2 mm×11 mm in size. The identification device 94 is preferably hermetically encased in a protective material, such as soda lime glass, a biocompatible material, to protect the electronics of the identification device 94 from the animal's body fluids. To ensure that the identification device 94 does not migrate within the animal's body, one end is coated with a polypropylene shell, which provides a surface to which fibrous connective tissue may bond relatively quickly.

The identification sensor 92 is configured to emit a low-power radio-frequency (rf) signal that, when received by the identification device 94, energizes the electronic circuitry of the identification device 94. Upon being energized, the identification device 94 emits a radio signal containing its unique identifying code, which is then detected by the identification sensor 92. Communication between the identification sensor 92 and the identification device 94 occurs when the identification device 94 is brought within detection range, which preferably is as great as the area covered by the weight sensor 72 (e.g., outside the secured enclosure 20), or within the range of the motion sensor 82 (e.g., inside the secured enclosure 20). Alternatively, the identification device 94 may reflect back a portion of the rf signal from the identification sensor 92 such that the reflected signal contains the identification code. This reflected signal is then received by the identification sensor 92. In yet another embodiment, the identification device 94 is not energized by the identification sensor 92. Instead, the identification device carried by a selected animal 30 includes a self-powered transmitter associated therewith that generates a signal, either continuously, periodically, or only when approaching the animal access system 10. The signal is then received by the identification sensor 92, which then forwards a signal to the identification sensor module indicating whether the animal is authorized or not.

The animal door lock module 100 is coupled to at least one door lock 102 that is positioned at one edge of the animal door 50. In the preferred embodiment, illustrated in FIG. 1, there are two door locks 102 positioned on opposite edges of the animal door 50, each mounted on the inside of the secured enclosure 20. Alternatively, the door locks 102 may be configured to be embedded within the walls of the animal door 50 and the boundary barrier 22, hidden from view. The door locks 102 preferably have a normally locked state and a temporarily unlocked state, and are toggled between these two states by signals from the animal door lock module 100.

Figure 2A:
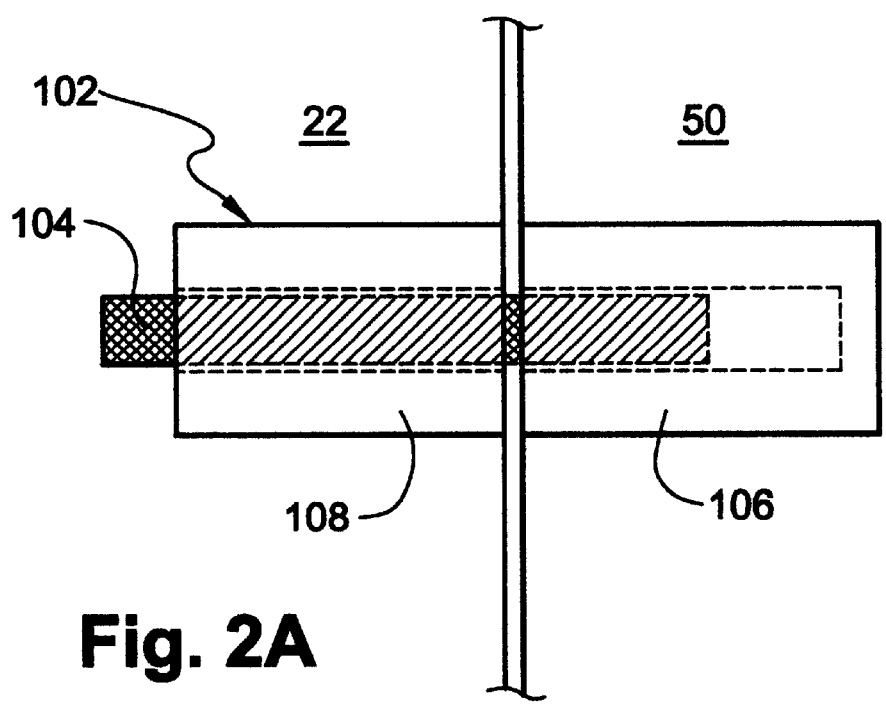
FIG. 2A is a schematic of a closed configuration of a door lock of the preferred embodiment of FIG. 1.
Figure 2B:
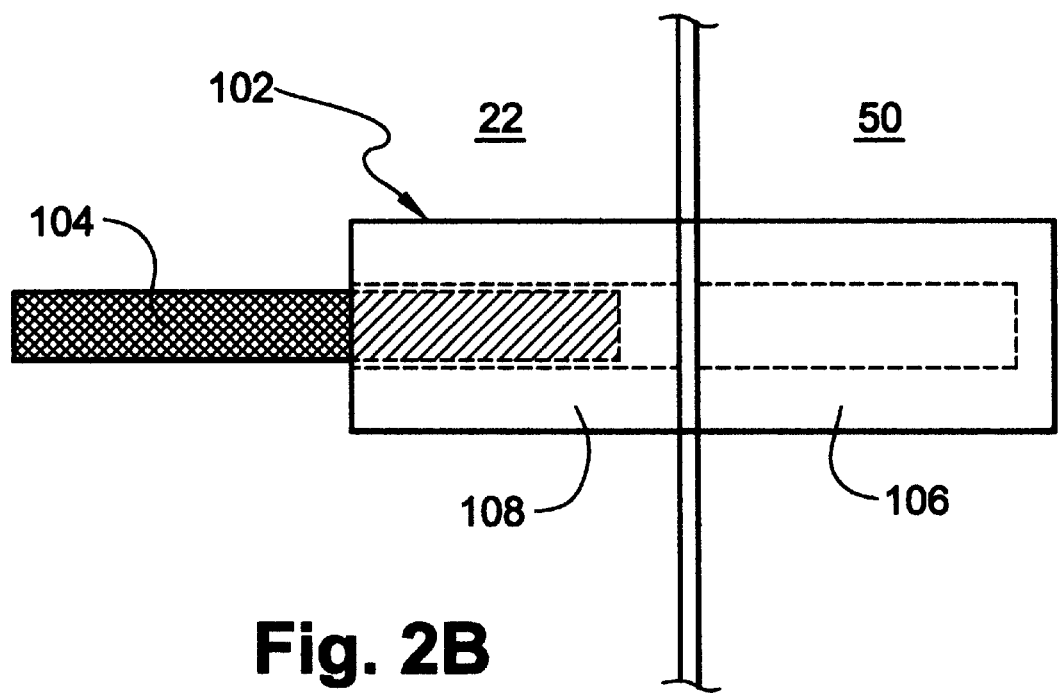
FIG. 2B is a schematic of an open configuration of the door lock of FIG. 2A.

Referring to FIGS. 2A and 2B, each door lock 102 preferably comprises a locking bolt 104, a fitting 106, and a solenoid 108. The solenoid 108 has a longitudinal bore therethrough and is mounted on the boundary barrier 22 immediately adjacent to the animal door 50. The fitting 106 has a longitudinal bore at least partly therethrough and is mounted at the edge of the animal door 50, directly adjacent to the solenoid 108, so that the respective bores are colinearly aligned. Each bore is sized to permit the passage of the locking bolt 104 therein. The locking bolt 104 is coupled to the solenoid 108 such that the locking bolt 104 can be moved between a normally locked position and a temporarily unlocked position by changing the status of the solenoid 108. When the solenoid 108 is activated, the lock 102 switches to the unlocked position, and the locking bolt 104 is fully retracted away from the animal door 50. In this unlocked configuration, the door lock 102 is disengaged, thereby allowing the animal door 50 to be opened. Deactivating the solenoid 108 returns the locking bolt 104 to its normally locked position, in which the locking bolt 104 extends to fit securely within the fitting 106, spanning the interface between the animal door 50 and the boundary barrier 22. In this locked configuration, the door lock 102 is engaged, thereby preventing the animal door 50 from being opened. Other embodiments of the present invention may utilize other mechanisms or configurations of door locks, including, but not limited to, electromagnets or motorized locking bolts, without departing from the spirit of the invention.

Referring back to FIG. 1, the security system controller 110 of the preferred embodiment is configured to couple to an existing, discrete, security system (not shown) that maintains the integrity of the enclosure's security so that an unauthorized breach of the animal door 50 triggers the security system of the entire enclosure to sound an alarm, silent or otherwise. In the preferred embodiment, the security system controller 110 is coupled to a door status sensor 112 positioned at the edge of the animal door 50 inside of the secured enclosure 20. Alternatively, the door status sensor 112 can be embedded within the walls of the animal door 50 and the boundary barrier 22, hidden from view. In either case, the door status sensor 112 is configured to communicate the open or closed status of the animal door 50 to the enclosure's security system via the security system interface controller 110. In one embodiment of the present invention, the door status sensor 112 comprises a detector 114 and a magnet 116. The detector 114 and the magnet 116 are mounted adjacent to one another, but on opposite sides of the interface between the animal door 50 and the boundary barrier 22. When the animal door 50 is closed, the detector 114 detects the presence of the magnet 116 and communicates the closed status to the security system controller 110. When the animal door 50 is open, the detector 114 detects that the magnet 116 is no longer adjacent to the detector 114 and communicates the open status to the security system controller 110. Preferably, the interface between the present invention animal access system and an existing security system is configured such that the security system is temporarily disabled when authorized entry through the animal door is permitted. It is also preferred that, during temporary disablement, the existing security system still serves to monitor all other doors and/or windows in the enclosure, so that it is disabled only with respect to the animal door. Such an arrangement prevents an intruder timing his unauthorized entry into the enclosure through one door to coincide with an authorized animal passing through the animal door.

Preferably the user interface 120 is coupled to the security system interface controller 110 and to the animal door control module 60, enabling a user to program into a database various operation parameters, such as system on/off status, the desired system operation configuration, a specified weight range and an identification code for each selected animal 30. Information about more than one selected animal 30 may be stored in the database and used to operate the system. This database may be contained for example in the user interface 120 or the animal door control module 60. Information about acceptable weight ranges may also be stored in the weight sensor module, if so configured. One embodiment of the present invention utilizes a keyboard for programming information from the user into the system, and an LCD display to communicate the system status to the user. The user interface 120 is configured to enable the user to monitor the current system status by reading from the LCD screen the programmed settings for the system configuration and the other operation parameters. Other means of setting the operation parameters may be used including, but not limited to, buttons or toggle switches. Also, other means of displaying system status to the user may be used including, but not limited to, LED lights or sounds from a speaker.

Advantageously, the present invention is configured to operate in one of several sequences. Preferably, the preferred embodiment is configured to be programmed so that when a selected animal 30 desires to enter the secured enclosure 20 from the outside, the animal may activate the animal door 50 by stepping onto the weight sensor 72. The weight sensor 72 then sends an appropriate signal to the weight sensor module 70 indicating both the animal's presence at the outside of the animal door 50 and the animal's weight. The weight sensor module 70 then processes the signal from the weight sensor 72 and produces a signal that is sent to the animal door control module 60. Based upon this signal, the animal door control module 60 then determines whether the animal's weight falls within a specified weight range corresponding to a selected animal 30 that was programmed into the database by the user. If so, the animal door control module 60 triggers the identification sensor module 90, which activates the identification sensor 92 to scan the area corresponding to the weight sensor 72 for an identification device 94 in the animal. If the weight of the animal at the animal door 50 is outside the specified weight range, the animal door control module 60 does not trigger the identification sensor module 90, and the animal door 50 remains locked. In this way, besides acting merely as an indicator of an animal's presence at the outside of the animal door 50, the weight sensor 72 serves as a first barrier to entry to the secured enclosure 20 of undesirable animals having a weight different from the selected animal 30.

If upon activation by the identification sensor module 90, the identification sensor 92 does not detect an identification device 94 after a user preset period of time, then the animal at the animal door 50 is deemed not to be a selected animal 30, and the animal door lock module 100 is not given a signal to unlock the animal door 50. If an identification device is detected within the set period of time, the code of the identification device is analyzed to determine if it matches any of the identification codes in the database, thereby corresponding to a selected animal 30. If the identification code does not correspond to that of a selected animal 30, then the animal at the animal door 50 is deemed not to be a selected animal 30, notwithstanding its coincidental acceptable weight, and the animal door lock module 100 is not given a signal to unlock the animal door 50. If the identification code does correspond to that of a selected animal 30, then the identification sensor module 90 sends an appropriate signal to the animal door module 60 to unlock the animal door 50.

Upon receiving a signal to initiate the unlocking of the animal door 50, the animal door control module 60 sends a signal to the animal door lock module 100 and to the security system controller 110. In response to the signal from the animal door control module 60, the security system controller 110 temporarily deactivates, for a user selected period of time, the response of the security system to the door status sensor 112 mounted at the animal door 50. This temporary deactivation ensures that the security system's alarm is not inadvertently activated by the authorized opening of the animal door 50. Importantly, the balance of the security system around the secured enclosure 20 is not deactivated. Concurrently, in response to the signal from the animal door control module 60, the animal door lock module 100 unlocks each of the door locks 102, but only for a preset period of time, thereby permitting the animal door 50 to be opened by the selected animal 30, or by an automated mechanism, such as a motor. Once the selected animal 30 has traversed the access opening 40, the animal door 50 returns to its normally closed position. The door locks 102 are then returned to their normally locked position, and the response of the security system to the door status sensor 112 is re-activated. If the animal door 50 fails to close within the selected period of time, the response of the security system to the door status sensor 112 is re-activated, resulting in the security system setting off an alarm. This would prevent an intruder from propping open the animal door, once an authorized animal has triggered opening of the door, to permit the intruder to sneak in.

In the alternative or in addition, the system may be configured so that upon detection of the presence of an animal at the outside of the animal door 50, the weight sensor 72 sends a signal directly to the identification sensor module 90 to activate the identification sensor 92 to scan for an identification device 94. Upon detection of a selected identification device 94, a corresponding weight range is then identified within the database to determine whether the weight of the animal on the weight sensor 72 falls within the corresponding weight range. If so, the animal door control module 60 initiates the unlocking of the animal door 50, and passage of the animal through the door is permitted. If not, the animal door 50 remains locked and does not open.

Under the circumstances where an animal desires to go through the animal door 50 from the inside of the secured enclosure 20, the approaching animal is detected by the motion sensor 82. The motion sensor 82 then sends a signal to the motion sensor module 80, indicating the animal's presence at the inside of the animal door 50. The motion sensor module 80 then produces a signal that is sent to the animal door control module 60, in the same manner as was described above for an animal approaching the animal door 50 from outside the secured enclosure. The animal door control module 60 then triggers the identification sensor module 90 to activate the identification sensor 92 to scan the area corresponding to the motion sensor 82 for a selected identification device 94 in the animal. If the identification sensor 92 detects a selected identification device 94, then upon receiving a signal to initiate the unlocking of the animal door 50, the animal door control module 60 responds as described above.

The system 10 is capable of preventing various possible unauthorized breaches of the secured enclosure 20 that may be attempted by humans or other animals. For example, because the open or closed status of the animal door 50 is monitored by the enclosure's security system via the door status sensor 112, unauthorized opening of the locked animal door 50 by brute force results in activation of the security system's alarm. If an unauthorized animal or a burglar attempts to follow a selected animal 30 into the secured enclosure 20 through the temporarily unlocked animal door 50, then the weight sensor 72 would detect the additional weight, resulting in activation of the alarm. Similarly, if the animal door 50 is held open by an unauthorized animal or burglar beyond the user-programmed set period of time after a selected animal 30 has passed through the animal door 50, the alarm would be activated.

Alternative modes of operation are contemplated in which one or more features of the present system may be bypassed manually or automatically by the user. For example, if the only animals permitted within the secured enclosure 20 are selected animals 30, the user may program the system to bypass the identification scanner when the animals desire to leave the enclosure. In another example, for selected animals that do not have an identification device 94 implanted in their body (e.g., a guest dog in the home) but are permitted access to the secured enclosure 20 from the outside, the user may program the system 10 to bypass the identification sensor 92, allowing the weight sensor to be the sole trigger for opening the door. Under that circumstance, where the user inputs the weight range for the guest animal, the animal door 50 is unlocked based solely on the weight of the animal detected by the weight sensor module 70.

If desired, a second motion sensor may be provided on the outside of the secured enclosure 20 to replace, or work in conjunction with, the weight sensor 72. Under that circumstance, the system 10 may be programmed to detect a moving animal outside the secured enclosure 20. Once detected, the weight sensor 72 is activated to detect the weight of the animal. It may also be desired that the weight sensor 72 be bypassed so that the identification sensor 92 is activated by the second motion sensor's sensing that an animal has approached the animal door 50 from the outside. It is also contemplated that a single motion detector be employed that is strategically positioned to detect motion on both sides of the animal door.

Moreover, a second weight sensor may be provided on the inside of the secured enclosure 20 to replace, or work in conjunction with, the motion sensor 82 on the inside of the secured enclosure 20. Alternatively, a single weight sensor may be employed that covers the area in front of both sides of the door. In either case, where both a weight sensor and a motion sensor are provided on one side of the animal door 50, either one may be bypassed. Indeed, if desired, the motion sensor 82, the weight sensor 72, and the identification sensor 92 may all be bypassed individually or collectively by programming the system 10 appropriately, although preferably not all three at the same time. It is contemplated that any one of these sensors be bypassed manually by triggering an override button on the user interface 120 or on the animal door control module 60. In that regard, it is further contemplated that the animal door control module have user interface features to permit local programming, in addition to the user interface 120, which can be used locally or remotely.

The versatility of operating the present system may be further appreciated. The step of detecting the animal may comprise either sensing the motion of the animal, sensing the weight of the animal, detecting an identification device, if one exists, or any combination of such steps. The step of determining whether the animal is a member of the set of selected animals 30 may comprise either sensing the animal's weight and comparing it to the weight range stored in the database and/or detecting a selected identification device 94. If desired, the determining step may be made manually. In other words, where it is possible to visually see the animal approach the door, the user could bypass the weight sensor 72 or the identification sensor 92 so that the motion sensor is the sole trigger for opening the door. If the user sees that the animal is unauthorized, the user could remotely trigger a manual override provided in the user interface 120 to prevent the animal door from being unlocked.

If desired, a weight sensor 72 that is either not capable of distinguishing among various magnitudes of weight, or has the ability to deactivate the feature of weight discrimination, may be used with the present system. In such an embodiment, the signal sent to the weight sensor module 70 and the animal door control module 60 only reflects the animal's presence at the animal door 50, and the identification sensor module 90 is triggered regardless of the animal's absolute weight.

With the present system, it is configured to interface with an existing enclosure security system. In an alternative embodiment, the animal access system 10 may be configured to operate independent of a discrete enclosure security system. In that embodiment, the present system 10 would further comprise an alarm (not shown) that is triggered by an unauthorized breach of the animal door 50. The enclosure security system would remain unaffected by such a breach.

Where it is desired to automatically open the animal door 50, means for opening the door may be provided, such as a motor, along with an animal door opener module to control actuation of the opening means. A pneumatically controlled actuator may also be used, if desired, rather than a motor. In such an embodiment of the system 10, when the animal door control module 60 sends a signal to the animal door lock module 100 to unlock the animal door 50, a contemporaneous signal is sent to the animal door opening module to actuate the means for opening the animal door 50.

The functions served by the various modules identified herein include providing power to the corresponding sensors and/or detectors and to pass on the signal sent by the sensor or detector, either with or without translation or modulation. If desired, the weight sensor module may also be configured to serve the additional function of discriminating between a predetermined set of weight, as discussed above. External power to the present system may be brought singularly to the animal door control module and distributed to each interfaced sensor/detector module, or may be brought in separately to each sensor/detector module. Persons skilled in the art should recognize that while the modules in the preferred embodiment are distinct and separate from one another, in other embodiments of the present invention, these modules may be coupled to one another in other configurations, or that the functions of these modules may be combined into one or more other modules.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. An animal access system for providing to a set of one or more selected animals ingress and egress access to a secured enclosure, the system comprising:

an access opening through a boundary barrier of the secured enclosure, wherein the access opening is sufficiently large to permit members of the set of selected animals to pass through the access opening to traverse the boundary barrier of the secured enclosure;

an animal door movable between an open position and a closed position, the animal door substantially blocking the access opening when in the closed position;

at least one door lock that prevents the animal door from opening when locked and permits the animal door to open when unlocked;

a weight sensor to detect the weight of an animal approaching the animal door, the weight sensor configured to provide a signal indicative of the magnitude of the weight of the animal;

a motion sensor to detect the existence of an animal approaching the animal door;

an animal identification sensor configured to distinguish members of the set of selected animals from other animals; and an animal door control module to control the door lock based upon signals from the weight sensor, the motion sensor and/or the animal identification sensor.

2. The animal access system described in claim 1, wherein the animal door control module is configured to interface with a security system employed for the secured enclosure, the security system being responsive to unauthorized breaches of the animal door.

3. The animal access system described in claim 1, wherein the system is programmable by a user to bypass one or more of the sensors.

4. The animal access system described in claim 1, further comprising at least one identification device for storing a code detectable by the identification sensor, the identification device configured to be carried by a selected animal in a manner that is not easily removable.

5. The animal access system described in claim 4, wherein the identification device is configured to be embedded subcutaneously in the body of the selected animal.

6. The animal access system described in claim 4, wherein the identification device is secured to a lockable collar which can only be removed by an authorized user.

7. The animal access system described in claim 1, wherein the animal door control module is coupled to a user interface that permits a user to program into a database various operation parameters.

8. An animal access system for providing to a set of one or more selected animals ingress and egress access to a secured enclosure, the system comprising:

an access opening through a boundary barrier of the secured enclosure, wherein the access opening is sufficiently large to permit members of the set of selected animals to pass through the access opening to traverse the boundary barrier of the secured enclosure;

an animal door configured to be in either an open position or a closed position, the animal door substantially blocking the access opening when in the closed position; and a weight sensor positioned near the animal door so that an animal must step on the weight sensor in order to traverse the boundary barrier, the weight sensor configured to provide a signal indicative of the magnitude of the weight of the animal.

* * * * *